H. KLATT.
WINDSHIELD WIPER, WASHER, AND CLEANER.
APPLICATION FILED MAR. 9, 1920.
1,369,817.
Patented Mar. 1, 1921
2 SHEETS—SHEET 1.
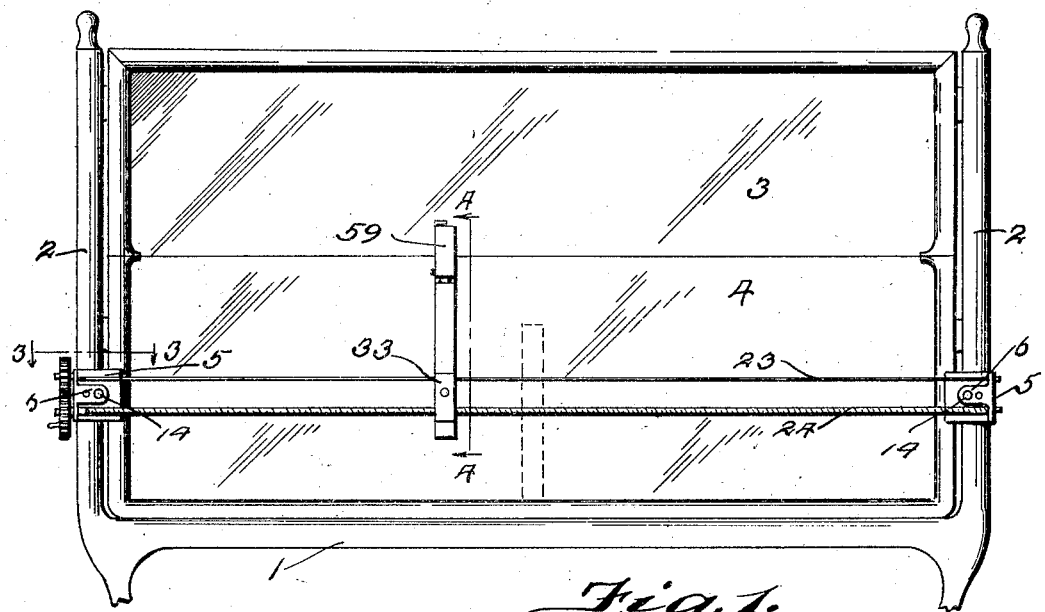
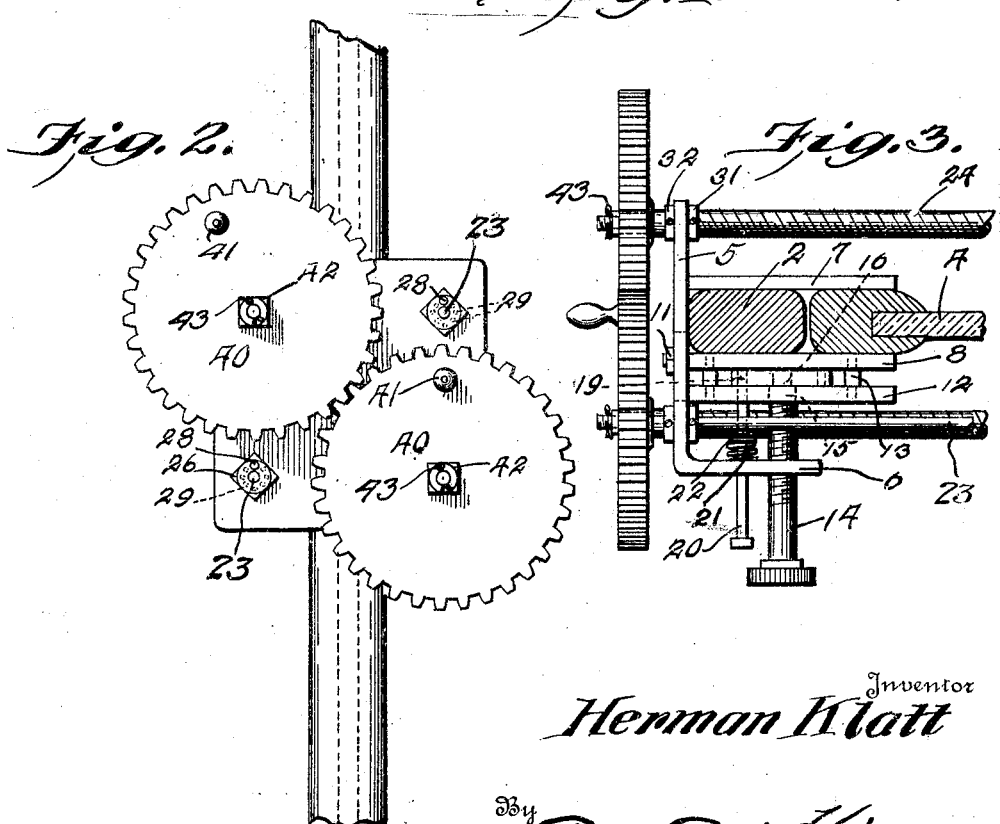
Inventor
Herman Klatt

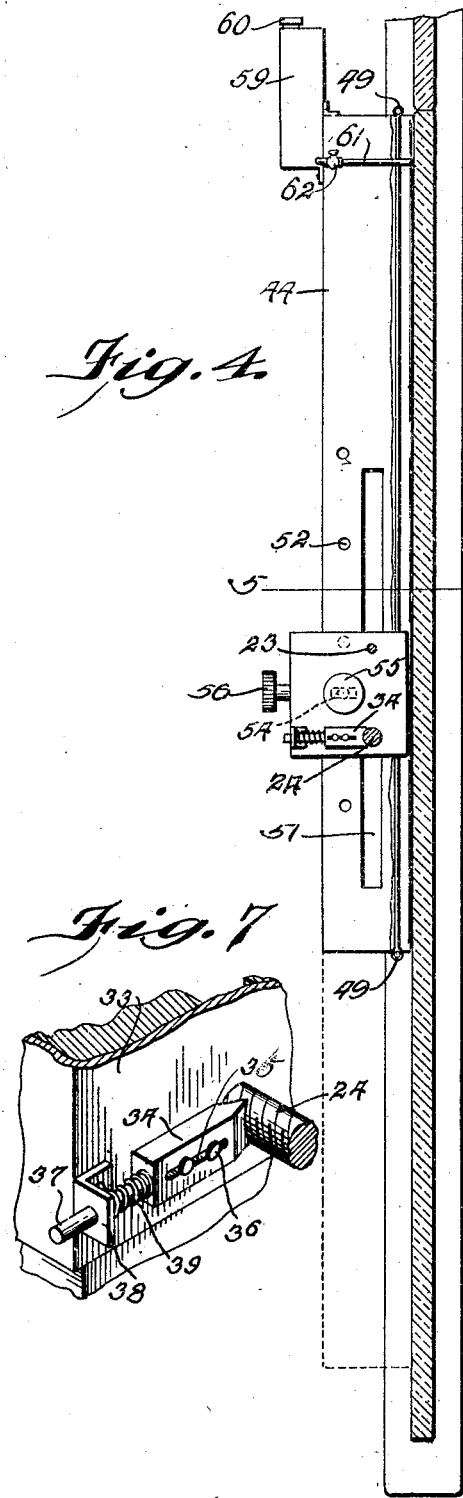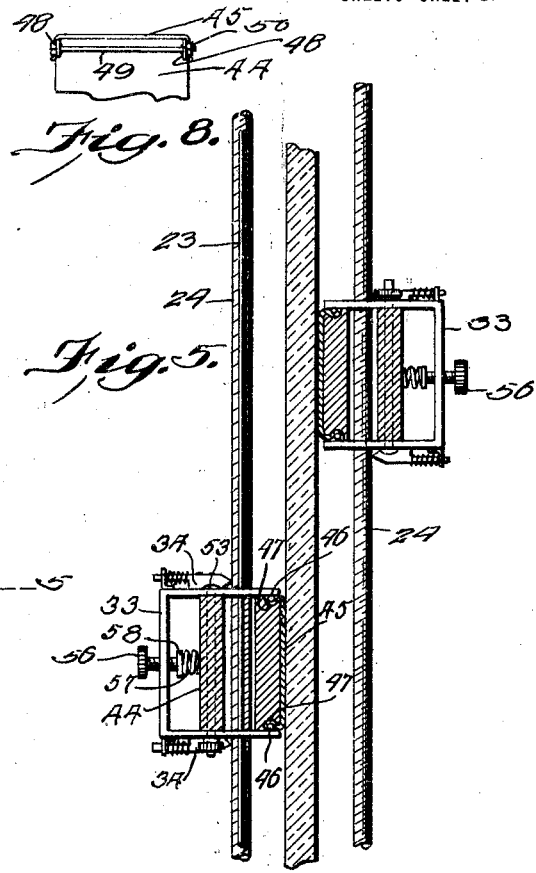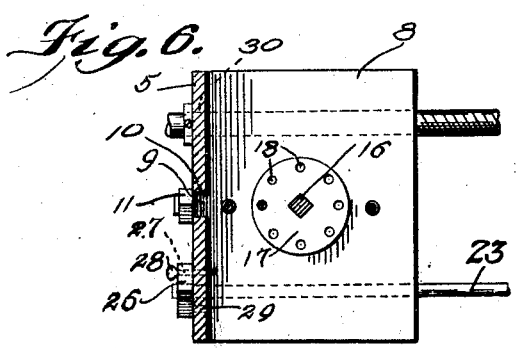

UNITED STATES PATENT OFFICE.

HERMAN KLATT, OF PUEBLO, COLORADO.

WINDSHIELD WIPER, WASHER, AND CLEANER.

1,369,817.　　　　Specification of Letters Patent.　　Patented Mar. 1, 1921.

Application filed March 9, 1920. Serial No. 364,475.

*To all whom it may concern:*

Be it known that I, HERMAN KLATT, a citizen of the United States, residing at Pueblo, in the county of Pueblo and State of Colorado, have invented new and useful Improvements in Windshield Wipers, Washers, and Cleaners, of which the following is a specification.

This invention relates to a device for wiping, washing and cleansing automobile windshields, and its primary object is to provide a simple, economical and efficient device of this character which may be employed to simultaneously act upon both sides of the windshield glass for the purpose of removing dust, cloudy moisture or other foreign particles obscuring vision, or for washing the windshield for general cleansing purposes.

Another object of the invention is to provide a device of the character described which may be readily and conveniently applied for use whenever desired and as readily removed after use, and which embodies simple and efficient locking means for holding it in applied position.

Still another object of the invention is to provide a device of the character and for the purpose described which is adapted to be easily and conveniently operated, which is adjustable to regulate the pressure of the cleaning or rubbing element, and which is also adjustable to operate over the entire area of the windshield so that both sides of the glass of both sections of the windshield may be rapidly and efficiently cleansed.

Still another object of the invention is to provide a cleaner which may be mounted for permanent use without obscuring the vision of the driver, and which may be used to clean but a single side of the windshield, if desired.

With these and other objects in view, the invention consists of the features of construction, combination and arrangement of parts, hereinafter fully described and claimed, reference being had to the accompanying drawings, in which:—

Figure 1 is a view in elevation looking toward one side of the windshield and showing the cleaner applied thereto.

Fig. 2 is an enlarged end elevation.

Fig. 3 is an enlarged sectional plan view on line 3—3 of Fig. 1.

Fig. 4 is an enlarged vertical section taken substantially on line 4—4 of Fig. 1.

Fig. 5 is a sectional plan view taken on line 5—5 of Fig. 4.

Fig. 6 is a vertical longitudinal section through one of the main supporting brackets.

Fig. 7 is a view of the cleaning element supporting carriage and one of the feed dogs carried thereby.

Fig. 8 is a detail view illustrating the means for fastening the cleaner fabric in position.

Referring to the drawings, 1 designates the windshield supporting frame, which may be of the usual construction and mounted in the ordinary manner upon an automobile, said frame including the uprights 2 upon which are pivotally mounted the windshield sections 3 and 4.

In carrying my invention into practice I provide a windshield cleaner comprising counterpart attaching or clamping brackets 5, adapted for clamping engagement with the uprights 2 and adjacent side pieces of the windshield frame at the opposite sides thereof. Each of these brackets 5 comprises a plate arranged in parallel relation to the body of the vehicle so as to extend on the outer side of the upright 2, and having an angularly bent arm 6 arranged to extend in rear of said upright. The bracket 5 carries an inwardly extending fixed clamping plate or jaw 7 adapted to bridge across the front face of the upright 2 and adjacent side piece of one of the windshield sections, and an adjustable clamping plate or jaw 8 arranged to extend on the opposite or rear faces of said upright and side pieces of the windshield frame. The adjustable jaw or clamping plate 8 is provided with a threaded guide piece or extension 9 movable in a guide slot 10 in the bracket 5 and held in guided connection therewith by a nut 11. A follower plate 12 is disposed in rear of the jaw or plate 8 and connected therewith by rivets or similar distance pieces 13, whereby the said plates 8 and 12 are held in spaced relation and mounted for simultaneous movement. An adjusting screw 14 is mounted in a threaded opening in the angularly bent arm 6 of the bracket 5 and extends loosely through and is journaled in an opening 15 in the plate 12, whereby the follower 12 and clamping plate or jaw 8 are adapted to be adjusted forwardly or rearwardly in unison. The screw 14 terminates at its forward end in an angular portion 16 which fits within an angular socket or opening in a locking disk 17, which disk is disposed between the jaw 8 and follower 12, the construction being such that when the screw 14 is turned in one direction or the other to advance or retract the jaw the locking plate or disk 17 will be turned or rotated therewith. The disk 17 is provided with an annular series of locking openings or recesses 18 adapted for engagement with the free end 19 of a sliding locking pin 20, whereby the screw 14 is adapted to be locked in its adjusted positions to hold the jaw 8 adjusted and the jaws 7 and 8 in rigid clamping engagement with the upright 2 and windshield section so as to obviate displacement of the bracket 5 when the cleaner is applied for use and also to hold the windshield section against pivotal movement during the cleaning operation. A spring 21 is provided to move the pin 20 forward to locking position, said spring being disposed between the arm 6 and a nut 22 adjustable on the pin, whereby the tension of the spring may be regulated as desired and its forward locking movement regulated according to the distance or travel of the jaw 8.

The bracket members 5 are connected and held in fixed relation by tie rods 23 and screw shafts 24, the sets of tie rods and screw shafts being arranged so that in practice they will extend horizontally across the front and rear faces of the windshield. The ends of the rod 23 are fitted in and extend through openings 25 in the brackets 5 and are threaded for the reception of circular nuts 26. By the adjustment of these nuts the rods may be tightened to the desired degrees to hold the bracket members 5 properly assembled. Each nut 26 is provided with an opening 27 for the passage of a fastening pin 28 adapted to enter any one of a series of openings 29 in the bracket 5, whereby said nut may be locked in adjusted position against any possibility of jarring loose from the vibrations of the vehicle when running.

The screw shafts 24 coöperate with the tie rods 23 to maintain the brackets 5 in assembled relation, and the ends of said shafts 24 extend through suitable bearing openings 30 in the brackets 5 and are held in position against longitudinal movement by collars 31 provided with set screws 32. By the construction described it will be evident that the component parts of the cleaner as described may be readily and conveniently mounted upon and removed from the windshield, and that the described construction of the clamps enables the brackets to be adjusted to different elevations on the windshield frame for coöperation with either windshield section, so that the cleaning elements may be properly disposed for cleaning either windshield section or successively cleaning both windshield sections. The device as a whole may be applied by sliding it from above down upon the uprights 2 and removed by a reverse sliding motion, or by disconnecting one of the bracket members 5 the device may be applied for use from either side of the windshield and fixed in position by reapplying the removed bracket member and properly adjusting the clamping devices.

Each rod 23 and associated screw shaft 24 supports a horizontally movable and vertically adjustable cleaner, which cleaner is mounted upon a carriage 33, fitted to slide upon the rod 23 and travel along the shaft 24. This carriage consists preferably of a substantially U-shaped body formed of sheet metal or other suitable material, the sides of which are provided with suitable openings for the passage of the rod 23 and shaft 24. On this carriage are mounted feed dogs 34 having beveled inner end portions to engage the threads of the shaft 24, said dogs operating in the nature of traveling nuts to effect movement of the carriage 33 along the shaft 24 in one direction or the other according to the direction of rotation of said shaft. Each dog 34 is formed with a longitudinal slot 35 receiving headed pins or studs 36 on the sides of the carriage 33, whereby the dog is slidably mounted and guided. A stem 37 projects outwardly from each dog and is slidably movable in a guide bracket 38 on the carriage, a coiled spring 39 being arranged to surround the stem between the dog and guide bracket, whereby the dog is yieldingly held in engagement with the shaft. It will thus be understood that when either shaft 24 is revolved the carriage 33 actuated thereby will be caused to move horizontally across the face of the windshield section with which it is in alinement, and that by first revolving the shaft in one direction and then in the reverse direction the carriage may be moved back and forth from side to side of the windshield. The means for rotating the screw shaft consists of intermeshing gears 40 upon the respective shafts, which gears are provided with crank handles 41 whereby either may be manually revolved to impart motion to the other and thus transmit motion to both shafts 24. By this construction it will be evident that the screw shafts may be operated either by the driver from his position in the body of the vehicle or by a person standing along side the car at one side of the windshield. It is, of course, to be understood that while I preferably provide each gear 40 with an operating handle 41, this is not essential and may be employed for greater convenience only. It will be understood that the gears may drive the shafts 24 so that the two cleaner supporting carriages 33 may be moved either in the same or in opposite directions simultaneously, and I therefore do not limit myself in this connection. Each gear is preferably removably mounted upon its shaft and held in position by a nut 42 and cotter pin 43, so that if desired one of the gears may be removed in the event that the operator should desire to operate only one of the cleaners.

Supported by and extending vertically through the carriage and between the sides thereof is a cleaning element comprising a bar 44 provided upon its inner surface with a facing 45 of a cleaning material, preferably a strip of rubber, felt or other suitable material adapted for an efficient rubbing and cleansing action on glass. This strip of material is drawn tightly against the active surface of the cleaner bar and secured at its longitudinal side edges by clamping rods 46 in receiving grooves 47 formed in the side of the bar. These rods extend above the top and bottom of the bar and are formed at their ends with eyes 48 for the reception of connecting bolts 49 fitted with nuts 50, whereby the rods are held in clamping position but may be readily relaxed or released whenever it is desired to remove the strip 45 and substitute a new or different one in its place. If desired, one edge of the fabric strip may be formed with a hem or pocket to receive one of the rods, so that after said rod is placed in its position to secure the hemmed edge the fabric may be drawn tight by means of its free edge and the latter then clamped in position by the other rod. By this means convenience is afforded in enabling strips of different materials to be used as desired for dry cleaning, washing or polishing, or a new strip substituted for a worn one whenever occasion requires.

The bar 44 is provided with a vertical slot 51 for passage of the rod 23 and shaft 24, said slot being of proper length in a vertical direction to permit the cleaner to be adjusted a distance at least equal to the height of one of the windshield sections, without requiring adjustment of the brackets 5. The bar 44 is further provided with a vertical series of transverse openings for the passage of a bolt 53, which also extends through elongated slots 54 in the sides of the carriage 33, the bolt being engageable with any of the openings 52 to hold the bar 44 at the desired elevation. The bolt is provided at one end with a securing nut 55 and is adapted for movement in the slots 54 to permit said bar to be adjusted toward and from the glass of the windshield, to adapt the cleaning fabric to bear with greater or less pressure on the glass. For the purpose of adjusting the bar, and holding it yieldingly in engagement with the glass, an adjusting screw 56 is provided, arranged to bear upon a coiled spring 57 disposed between the same and the rear surface of the bar 44, whereby the spring may be compressed to a greater or less degree to hold the bar yieldingly pressed with the desired force against the glass. Fitted on the screw 56 is a nut or adjustable abutment 58 bearing against the spring 57, through the adjustments of which tension of the spring may be regulated, thus giving a double adjustment to vary the working pressure of the cleaner to a highly sensitive degree.

As stated, the cleaning surface 45 may be of any suitable material for dry cleaning, washing or polishing, and if desired suitable means may be provided upon each cleaner bar 44 for supplying a cleansing fluid to the fabric 45 or between the same and the surface of the windshield glass. To this end a tank 59 containing a desired cleansing fluid may be mounted upon the top of the bar and provided with a suitable filling inlet 60. A pipe 61 leads from the bottom of this tank and has its discharge end arranged to deliver the fluid to the fabric or between the same and the surface of the glass, and this pipe is provided with a controlling valve 62. The tank may be of a size to hold a required amount of cleansing fluid for one or more cleansing actions, and forms a convenient means for carrying sufficient cleansing fluid for use at any time.

The cleaner is applied to the windshield in an obvious manner, and by adjustment of the brackets 5 may be supported at different elevations upon the uprights 2 to properly dispose the cleaning elements for cleaning either the upper or the lower windshield glass or successively cleaning such glasses. Each cleaner is preferably made of a restricted length and width, so that, if desired, the device may be permanently mounted for use upon the windshield without liability of the cleaning device obstructing the vision of the driver of the vehicle. It will also be understood that each cleaner is adjustable independently of the brackets 5 upon its carriage 33, and hence may be made of less length than the depth of either windshield glass and adjusted therewith as required in the cleansing of the glasses. The screw shafts 24 may be operated in unison either from the interior of the vehicle or from a position on the ground adjacent to the vehicle by rotating one or the other of the gears 40 through the medium of its crank, and it will be understood that in practice the two cleaners 44 will be operated in unison and may be caused to move simultaneously in the same or opposite directions as desired, according to the direction of the threads upon the screw shafts 24. Also by removing one of the gears 40, the screw shaft operated thereby may be thrown out of action so that one cleaner only may be operated while the other remains inactive. In practice the brackets 5, through the medium of their clamping elements, will firmly and securely fasten the device to the windshield, against any liability of the working parts becoming loose from jars or vibrations in the running of the vehicle, while said brackets may be readily and conveniently adjusted at any time for positioning the cleaners to operate upon the glass of either windshield section. In order to prevent marring of the parts of the windshield supporting frame and windshield by pressure of the clamping members 7 and 8, pieces of sheet rubber may be placed between the contacting surfaces, so as to serve the purpose described, as well as the function of anti-rattling elements.

From the foregoing description, taken in connection with the drawings, the construction, mode of use and advantages of my improved windshield cleaner will be readily understood without a further and extended description, and it will be seen that a device of the character specified is provided which is simple of construction and capable of being installed and used at a comparatively low cost. While the construction disclosed is preferred, it will, of course, be understood that various modifications, falling within the spirit and scope of the invention, as defined in the appended claims, may be made without departing from the principles of the invention.

Having thus fully described my invention, I claim:

1. A windshield cleaner comprising brackets adapted for engagement with the side uprights of a windshield frame, a shaft extending between said brackets, a carriage arranged for travel upon the shaft, and a cleaning element supported by the carriage, said cleaning element being vertically adjustable on the carriage and also adjustable toward and from the surface of the glass.

2. In a windshield cleaner, the combination of brackets adapted for engagement with the side uprights of a windshield frame, means for securing said brackets in position, a shaft extending between said brackets, a carriage mounted for travel on said shaft, a cleaning element supported by the carriage for adjustment in a vertical direction and also toward and from the surface of the glass, and means upon the carriage for adjustably and yieldably pressing the cleaning element against the surface of the glass.

3. In a windshield cleaner, the combination of brackets adapted for attachment to the side uprights of a windshield frame, a shaft extending between said brackets, means for securing the brackets in position, a carriage mounted for travel on the shaft, a vertically disposed cleaner supported upon the carriage and mounted for vertical adjustment thereon, said cleaner also being mounted on the carriage for adjustment toward and from the face of the glass, and devices on the carriage for holding the cleaner in its adjusted positions.

4. In a windshield cleaner, the combination of supporting brackets, fixed and movable clamping members carried by the brackets to engage the side elements of the windshield supporting frame and the windshield, a screw upon each bracket for adjusting the adjustable clamping member, a locking member carried by and rotatable with the screw, a locking device upon the bracket for engagement with the locking member, a screw shaft extending between and journaled in the brackets, and a cleaning element mounted for travel on said shaft.

5. In a windshield cleaner, the combination of supporting brackets adapted for engagement with the side uprights of a windshield, clamping means for holding said brackets in adjusted position, screw shafts extending between and journaled on the brackets, means for operating said shafts, carriages mounted to travel upon the shafts, a cleaner bar mounted on each carriage, said bar being vertically adjustable on the carriage and adjustable toward and from the face of the glass, and said bar also being provided in its side faces with grooves, a strip of cleaning fabric extending across the face of the bar and fitted at its edges in said grooves, means for securing the fabric in the grooves, and means for securing each cleaner bar in its adjusted positions.

In testimony whereof I affix my signature.

HERMAN KLATT.